(12) United States Patent
Utsunomiya et al.

(10) Patent No.: US 8,159,471 B2
(45) Date of Patent: Apr. 17, 2012

(54) COORDINATE INPUT DEVICE AND DISPLAY DEVICE

(75) Inventors: Sumio Utsunomiya, Matsumoto (JP); Takeshi Koshihara, Suwa (JP); Ryo Ishii, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 874 days.

(21) Appl. No.: 12/051,175

(22) Filed: Mar. 19, 2008

(65) Prior Publication Data

US 2008/0259044 A1 Oct. 23, 2008

(30) Foreign Application Priority Data

Apr. 20, 2007 (JP) ................. 2007-111480

(51) Int. Cl.
*G09G 5/00* (2006.01)
(52) U.S. Cl. ........ 345/174; 345/104; 345/156; 345/173; 178/18.01; 178/18.06
(58) Field of Classification Search .......... 345/156, 345/173, 87, 174, 104; 178/18.06, 18.01; 463/37
See application file for complete search history.

(56) References Cited

U.S. PATENT DOCUMENTS

| | | | | |
|---|---|---|---|---|
| 4,087,625 A * | 5/1978 | Dym et al. | ........... | 178/18.06 |
| 4,659,874 A | 4/1987 | Landmeier | | |
| 5,940,064 A * | 8/1999 | Kai et al. | ........... | 345/173 |
| 6,288,707 B1 | 9/2001 | Philipp | | |
| 6,297,811 B1 | 10/2001 | Kent et al. | | |
| 2002/0039092 A1* | 4/2002 | Shigetaka | ........... | 345/156 |
| 2002/0101410 A1* | 8/2002 | Sakata et al. | ........... | 345/173 |

FOREIGN PATENT DOCUMENTS

| | | |
|---|---|---|
| JP | A 5-19233 | 1/1993 |
| JP | A-11-15591 | 1/1999 |
| JP | A 2000-81610 | 3/2000 |
| JP | A-2004-333302 | 11/2004 |

* cited by examiner

*Primary Examiner* — Lun-Yi Lao
*Assistant Examiner* — Insa Sadio
(74) *Attorney, Agent, or Firm* — Oliff & Berridge, PLC

(57) ABSTRACT

Provided is a coordinate input device including: a plurality of detection electrodes which are arranged in a planar shape in a detection area of a substrate; a plurality of routed wires connected to the plurality of detection electrodes; a coating film which coats the plurality of detection electrodes; a detection unit which detects a capacitance variation between the plurality of detection electrodes via the coating film; and a calculation unit which calculates a capacitance forming position from the detected result of the detection unit, wherein the plurality of detection electrodes are formed in the detection area in a first direction and are arranged in a second direction orthogonal to the first direction so as to configure a plurality of detection electrode pairs, each of which is composed of a pair of adjacent detection electrodes, a ratio of the width of one-side detection electrode of the pair of detection electrodes to the width of the other-side detection electrode of the pair of detection electrodes configuring each of the detection electrode pairs is changed according to the first direction, and the plurality of routed wires are connected to one ends of the first direction of the detection electrodes and are formed on the same layer as the plurality of detection electrodes.

8 Claims, 13 Drawing Sheets

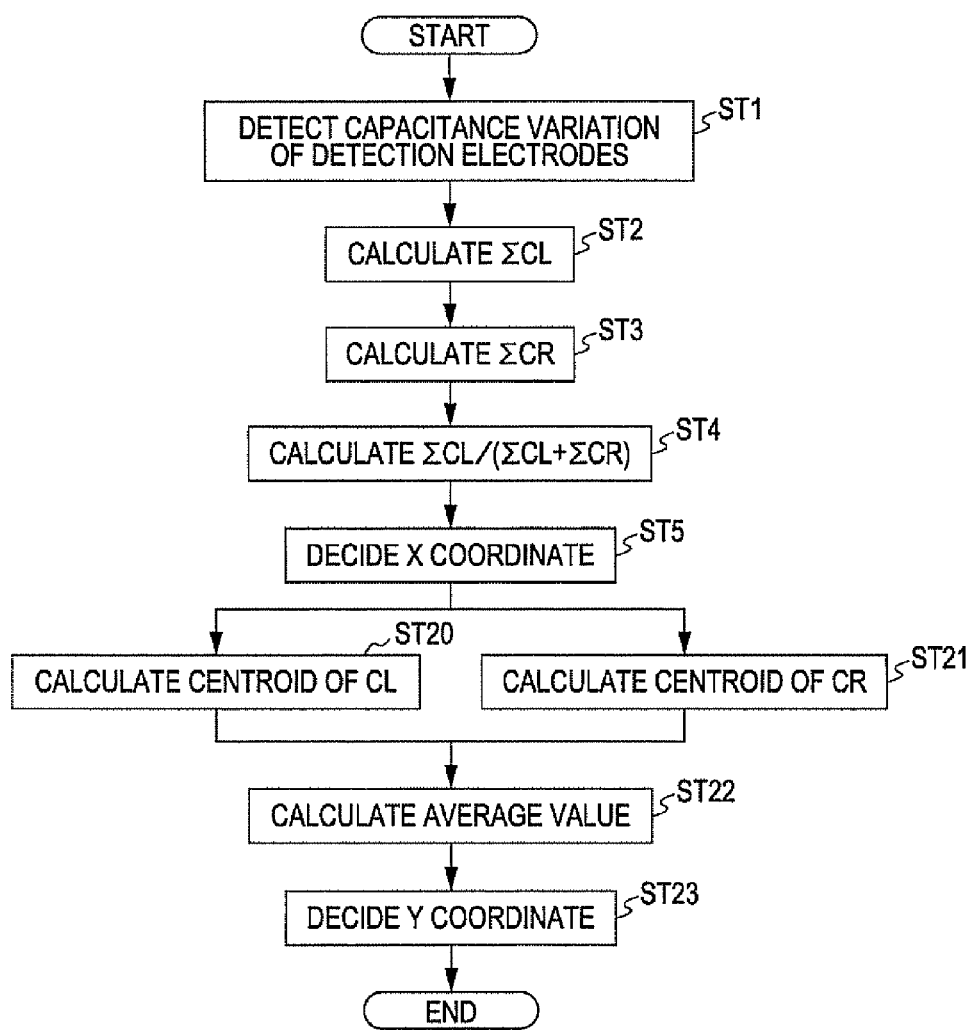
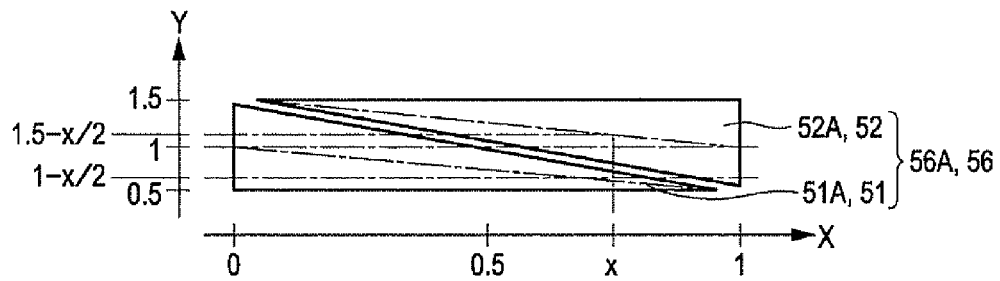

COORDINATE INPUT DEVICE AND DISPLAY DEVICE

BACKGROUND

1. Technical Field

The present invention relates to a coordinate input device such as a touch panel and a display device.

2. Related Art

Recently, as a small information electronic apparatus such as a personal digital assistant (PDA) or a notebook type personal computer come into wide use, a display device including a touch panel for performing an input operation by touching an object such as a finger or a pen on a display screen is widely used. In such a touch panel, a method of detecting a touch position of a finger includes an electrostatic capacity method. The electrostatic capacity method indicates a method of flowing weak current by electrostatic capacity formed by touching a finger of a person on a display surface and detecting the touch position from the amount of current. Here, in the electrostatic capacity method, since a planar detection electrode and a dielectric film laminated on the detection electrode are used, the electrostatic capacity is formed by touching the finger on the dielectric film.

In the touch panel using the electrostatic capacity method, as a method of detecting a two-dimensional coordinate, there is a method of obtaining an X coordinate and a Y coordinate using a detection electrode for obtaining the X coordinate and a detection electrode for obtaining the Y electrode (for example, see JP-A-2000-81610, JP-A-1993-19233 and U.S. Pat. No. 6,288,707).

However, even in the known coordinate input device, the following problems occur. That is, in order to ensure an electric insulating state, two-dimensional intersection is realized by forming the detection electrode for obtaining the X coordinate and the detection electrode for obtaining the Y coordinate on different layers via an insulating film or forming wires on two different layers via an insulating film. Accordingly, the detection electrode or the wires need to be formed on the upper and lower layers of the insulating film and thus at least the three-layer structure is obtained. Therefore, a manufacturing process becomes complicated.

SUMMARY

An advantage of some aspects of the invention is that it provides a coordinate input device and a display device, which are capable of simplifying a manufacturing process.

According to an aspect of the invention, there is provided a coordinate input device including: a plurality of detection electrodes which are arranged in a planar shape in a detection area of a substrate; a plurality of routed wires connected to the plurality of detection electrodes; a coating film which coats the plurality of detection electrodes; a detection unit which detects a capacitance variation between the plurality of detection electrodes via the coating film; and a calculation unit which calculates a capacitance forming position from the detected result of the detection unit, wherein the plurality of detection electrodes are formed in the detection area in a first direction and are arranged in a second direction orthogonal to the first direction so as to configure a plurality of detection electrode pairs, each of which is composed of a pair of adjacent detection electrodes, a ratio of the width of one-side detection electrode of the pair of detection electrodes to the width of the other-side detection electrode of the pair of detection electrodes configuring each of the detection electrode pairs is changed according to the first direction, and the plurality of routed wires are connected to one ends of the first direction of the detection electrodes and are formed on the same layer as the plurality of detection electrodes.

In this invention, since the detection electrodes and the routed wires are formed on the same layer, it is possible to simplify a manufacturing process. That is, since the detection electrodes and the routed wires are connected to each other in the ends of the first direction of the detection electrodes formed in the first direction, the routed wires routed from the plurality of detection electrodes do not need to cross each other. Accordingly, since the detection electrodes and the routed wires can be formed on the same layer, it is possible to simplify a manufacturing process and reduce manufacturing cost.

By changing the ratio of the widths of two detection electrodes configuring the detection electrode pair, when the capacitance is formed by the touch of a finger, the ratio of the capacitance variation detected by one detection electrode configuring the detection electrode pair to the capacitance variation detected by the other detection electrode is changed according to the capacitance forming position. The calculation unit calculates the capacitance forming position of the first direction from a difference between the detected results. By providing the plurality of detection electrode pair each having a band shape in the second direction, when the capacitance is formed, the ratio of the variations detected by every detection electrode pair is changed according to the capacitance forming position. The calculation unit calculates the capacitance forming position of the second direction from a difference between the detected results. Accordingly, the calculation unit calculates a two-dimensional coordinate according to the capacitance forming position.

In the coordinate input device of the invention, the appearances of the plurality of detection electrodes may be equal, the width of one-side detection electrode configuring each of the detection electrode pairs may be decreased from one side to the other side of the first direction, and the width of the other-side detection electrode may be increased from one side to the other side of the first direction.

In this invention, since the shapes of the detection electrodes are the same, it is possible to readily detect a two-dimensional coordinate by the calculation unit.

In the coordinate input device of the invention, a pair of sides of the plurality of detection electrodes in the first direction may have a straight line shape.

In this invention, since the sides have the straight line shape, it is possible to densely arrange the plurality of detection electrodes. Accordingly, it is possible to improve the detection precision of a two-dimensional coordinate by the calculation unit.

In the coordinate input device of the invention, one of the pair of sides may be parallel to the first direction and the other one thereof may be inclined from the first and second directions, and the other sides of the pair of detection electrodes configuring each of the detection electrode pairs may face each other.

In this invention, the appearance of the detection electrode pairs has a band shape having the same width and having a pair of sides parallel to the first direction. Accordingly, it is possible to facilitate the calculation of the capacitance forming position in the second direction and improve detection precision. If the first and second directions are orthogonal to each other, the appearance of the detection electrode pairs has a substantially rectangular shape.

In the coordinate input device of the invention, the calculation unit may include a first coordinate calculation unit which calculates a first coordinate which is a detection position of the first direction, on the basis of the sum of the capacitance variations of the one-side detection electrodes and the sum of the capacitance variations of the other-side detection electrodes; a second coordinate calculation unit which calculates a second coordinate which is a detection position of the second direction, from the capacitance variations of the detection electrode pairs.

In this invention, the first coordinate calculation unit calculates the first coordinate which is the capacitance forming position of the first direction, from the ratio of the capacitance variation detected by one of the pair of detection electrodes configuring the detection electrode pair and the capacitance variation detected by the other one thereof. The second coordinate calculation unit calculates the second coordinate which is the capacitance forming position of the second direction, from the ratio of the capacitance variations detected by the detection electrode pairs.

In the coordinate input device of the invention, the plurality of detection electrodes may configure correction detection electrode pairs, each of which is composed of the one-side detection electrode configuring the detection electrode pair and the other-side detection electrode configuring another detection electrode pair adjacent to the one-side detection electrode, and the calculation unit may include a first coordinate calculation unit which calculates a first coordinate which is a detection position of the first direction, on the basis of the sum of the capacitance variations of the one-side detection electrodes and the sum of the capacitance variations of the other-side detection electrodes; and a second coordinate calculation unit which calculates a second coordinate which is a detection position of the second direction, from the capacitance variations of the detection electrode pairs, the capacitance variations of the one-side detection electrode and the other-side detection electrode configuring another detection electrode pair adjacent to the one-side detection electrode, and the first coordinate.

In this invention, since the second coordinate is calculated in consideration of the value of the first coordinate and the capacitance variations of the correction detection electrode pairs in addition to the capacitance variations of the detection electrode pairs, it is possible to improve the calculation precision of the second coordinate.

In the coordinate input device of the invention, the second coordinate calculation unit may calculate the second coordinate which is corrected on the basis of the inclinations of central lines of a width direction of the correction detection electrode pairs to the central lines of a width direction of the detection electrode pairs.

In this invention, since the extending direction of the detection electrode pairs are different from that of the correction detection electrode pairs, the second coordinate is calculated in consideration of the inclination of the central axes of the detection electrode pairs and the correction detection electrode pairs, thereby improving the calculation precision of the second coordinate.

In the coordinate input device of the invention, the calculation unit may include a first coordinate calculation unit which calculates a first coordinate which is a detection position of the first direction, on the basis of the sum of the capacitance variations of the one-side detection electrodes and the sum of the capacitance variations of the other-side detection electrodes; and a second coordinate calculation unit which calculates a second coordinate which is a detection position of the second direction, on the basis of the sum of the capacitance variations of the one-side detection electrodes and the sum of the capacitance variations of the other-side detection electrodes.

In this invention, the sum of the capacitance variations of the one-side detection electrodes and the sum of the capacitance variations of the other-side detection electrodes are separately calculated and thus the second coordinate is calculated.

In the coordinate input device of the invention, the plurality of routed wires may be connected to one ends of the first direction of the detection electrodes.

In this invention, it is possible to reduce the lengths of the routed wires. Accordingly, the same material as the detection electrodes made of a material having high resistivity may be used as the material of the routed wires. Accordingly, since the detection electrodes and the routed wires can be formed by the same process, it is possible to simplify a manufacturing process and reduce manufacturing cost.

According to another aspect of the invention, there is provided a display device including: the above-described coordinate input device; and another substrate which faces the substrate via a photoelectric layer.

In this invention, since the detection electrodes and the routed wires can be formed on the same layer, it is possible to simplify a manufacturing process and reduce manufacturing cost.

In the display device of the invention, the plurality of detection electrodes may be formed on a side of the substrate, which is separated from the photoelectric layer.

In this invention, since the plurality of detection electrodes are provided on the outer surface of the display device, it is possible to improve detection precision of the touch position of a finger.

In the display device of the invention, the plurality of detection electrodes may be formed on a side of the substrate, which is located at the side of the photoelectric layer.

In this invention, since the members configuring the display device, the plurality of detection electrodes, and the routed wires are formed on the same plane of the substrate, it is possible to simplify a manufacturing process.

BRIEF DESCRIPTION OF THE DRAWINGS

The invention will be described with reference to the accompanying drawings, wherein like numbers reference like elements.

FIG. 12 is a flowchart showing the method of calculating the coordinate.

FIG. 13 is a view showing a method of correcting a coordinate.

DESCRIPTION OF EXEMPLARY EMBODIMENTS

First Embodiment

Figure 1:
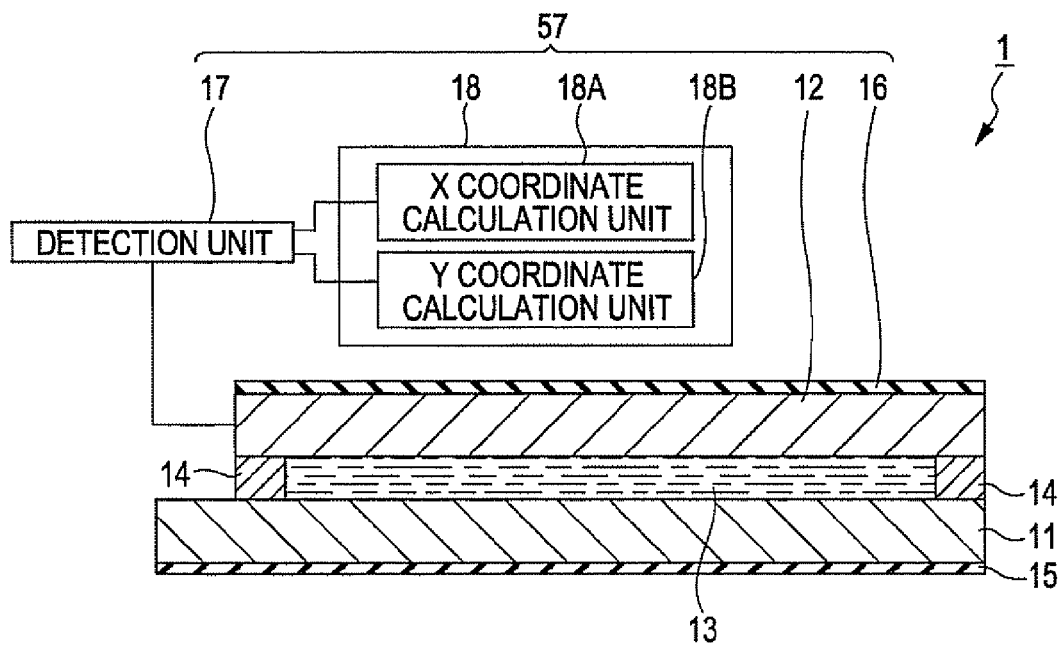
FIG. 1 is a schematic cross-sectional view showing a display device according to a first embodiment of the invention.
Figure 2:
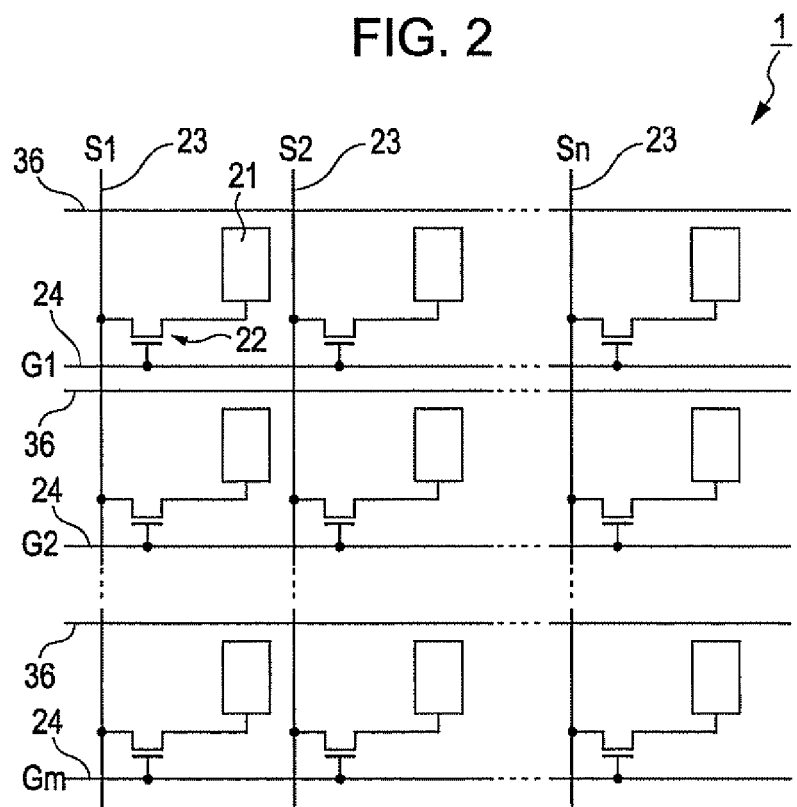
FIG. 2 is an equivalent circuit diagram of the display device.
Figure 3:
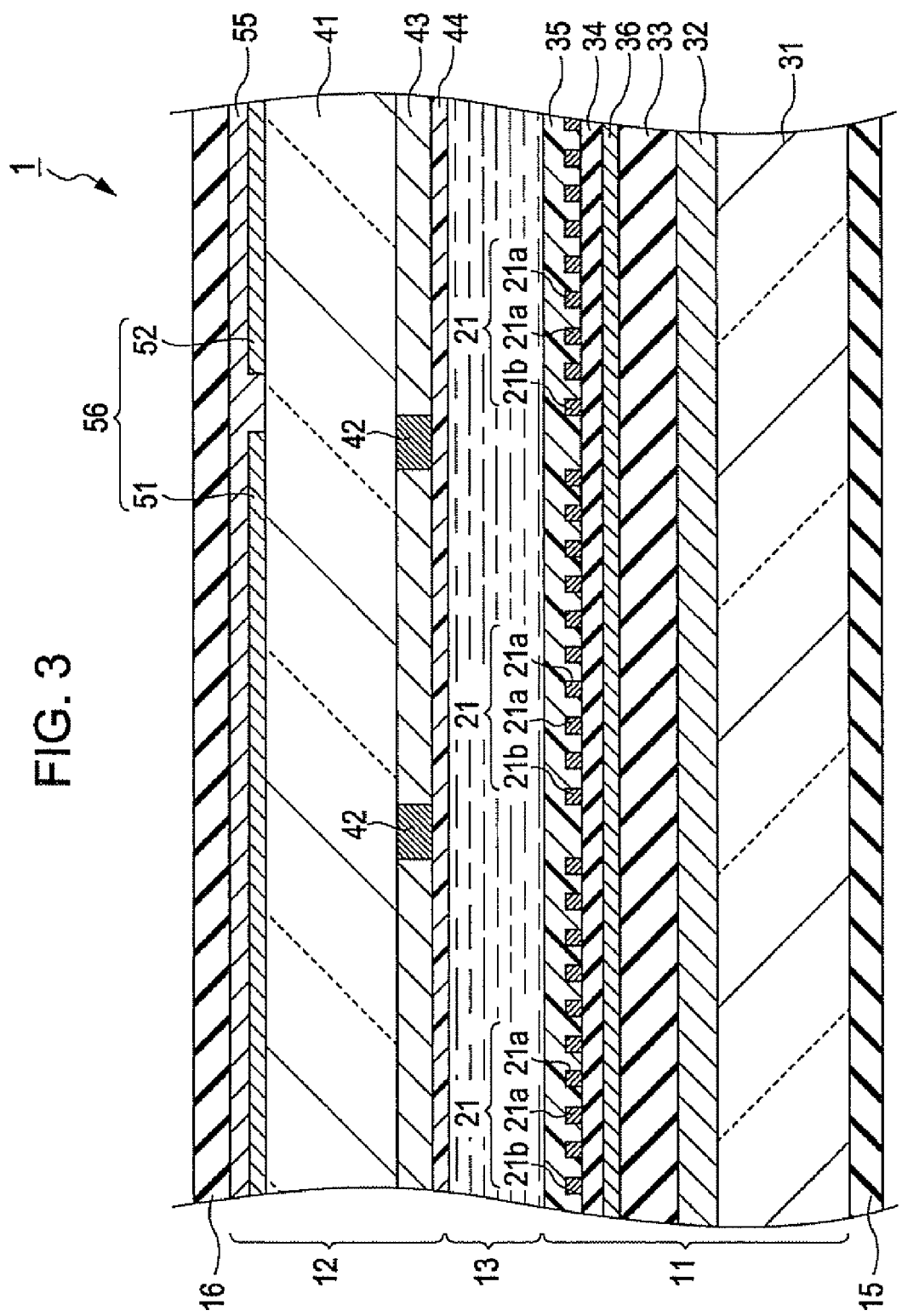
FIG. 3 is a cross-sectional view showing a sub pixel area of the display device.
Figure 4:
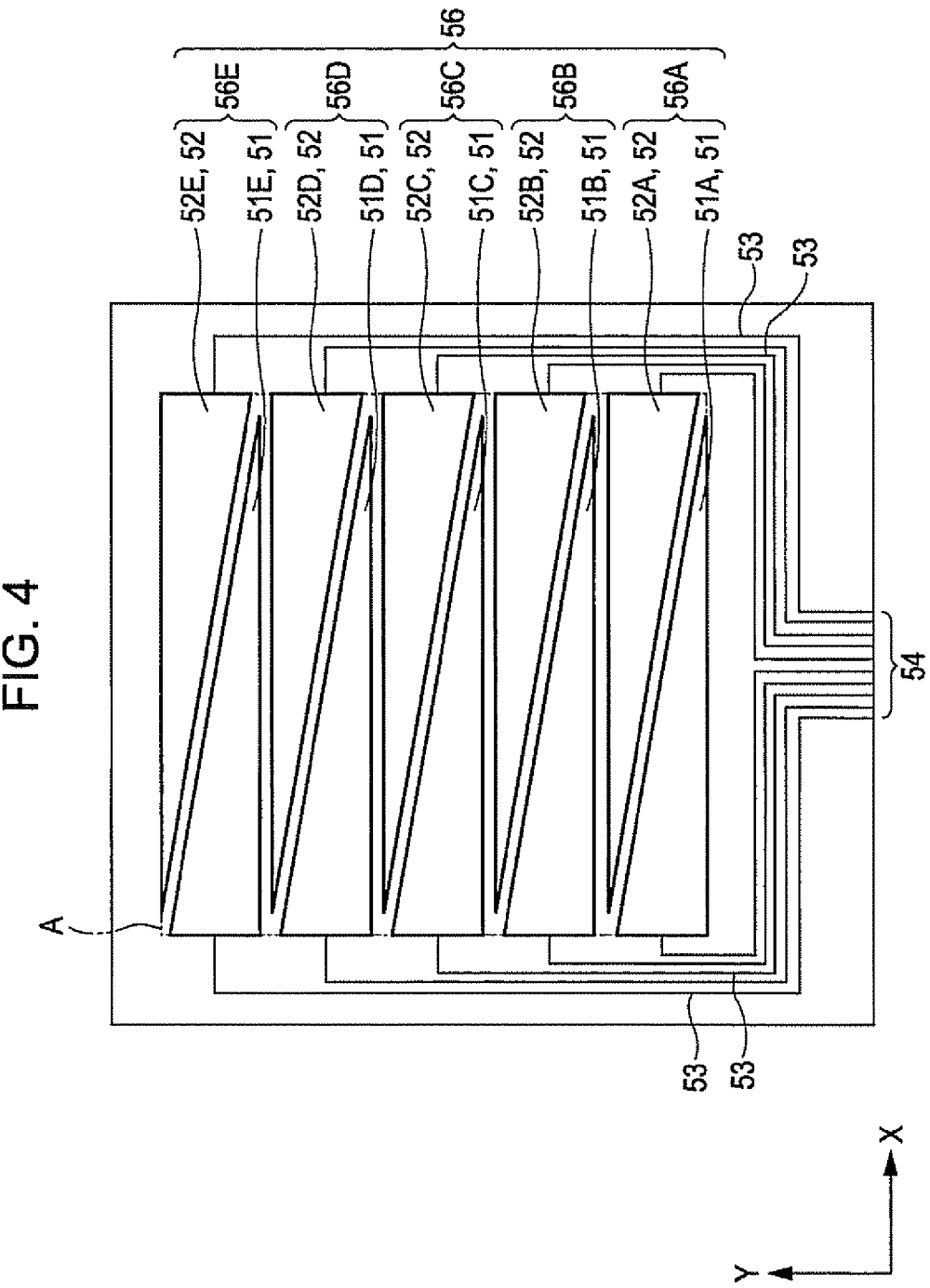
FIG. 4 is a plan view showing an outer surface side of a counter substrate.

Hereinafter, a coordinate input device and a display device according to a first embodiment of the invention will be described with reference to the accompanying drawings. In each view used for following description, the scale of each member is appropriately changed in order to recognize the size of each member. Here, FIG. 1 is a schematic view showing the display device, FIG. 2 is an equivalent circuit diagram of the display device, FIG. 3 is a cross-sectional view showing the display device, and FIG. 4 is a plan view showing an outer surface side of a counter substrate.

Display Device

The display device 1 according to the present embodiment is a transmissive color liquid crystal display device in which three sub pixel areas for outputting light of red (R), green (G) and blue (B) configure one pixel. Here, a display area which is a minimum unit configuring the display is called a "sub pixel area".

First, the schematic configuration of the display device according to the present embodiment will be described. As shown in FIG. 1, the display device 1 according to the present embodiment includes a device substrate (another substrate) 11 which is an active matrix substrate, a counter substrate (substrate) 12 which faces the device substrate 11, and a liquid crystal layer (photoelectric layer) 13 interposed between the device substrate 11 and the counter substrate 12.

The display device 1 has a seal material 14 which has a substantially rectangular frame shape in a plan view and is provided at a peripheral portion of an area in which the device substrate 11 and the counter substrate 12 face each other. The device substrate 11 and the counter substrate 12 are attached to each other by the seal material 14. Here, in the display device 1, an image display area is formed in the seal material 14. In the display device 1, light is irradiated from an outer surface side (a side spaced apart from the liquid crystal layer 13) of the device substrate 11.

The display device 1 further includes a polarization plate 15 provided at the outer surface side of the device substrate 11 and a polarization plate 16 provided at an outer surface side (a side spaced apart from the liquid crystal layer 13) of the counter substrate 12. The display device 1 further includes a detection unit 17 and a calculation unit 18.

As shown in FIG. 2, in the image display area of the display device 1, a plurality of sub pixel areas are arranged in a matrix. Each of the plurality of sub pixel areas includes a pixel electrode 21 and a thin-film transistor (TFT) 22 for controlling the switching of the pixel electrode. In the image display area, a plurality of data lines 23 and scan lines 24 are arranged in a lattice shape.

The sources of the TFTs 22 are connected to the data lines 23, the gates thereof are connected to the scan lines 24, and the drains thereof are connected to the pixel electrodes 21.

The data lines 23 supply image signals S1, S2, . . . , and Sn supplied from a driving circuit (not shown) provided in the display device 1 to the sub pixel areas. Here, the data lines 23 may supply the image signals S1 to Sn in line sequence or a plurality of adjacent data lines 23 may supply the image signals for each group.

The scan lines 24 supply scan signals G1, G2, . . . , and Gm supplied from a driving circuit (not shown) provided in the display device 1 to the sub pixel areas. Here, the scan lines 24 supply the scan signal G1 to Gm at a predetermined timing in line sequence in a pulsed manner.

In the display device 1, the TFTs 22 which are switching elements are turned on only in a predetermined period by the input of the scan signal G1 to Gm such that the image signals S1 to Sn supplied from the data lines 23 are written to the pixel electrodes 21 at predetermined timings. The image signals S1 to Sn having predetermined levels, which are written to the liquid crystal via the pixel electrodes 21, are held in a predetermined period between the pixel electrodes 21 and a common electrode 36.

Next, the detailed configuration of the display device 1 will be described with reference to FIGS. 3 and 4. As shown in FIG. 3, the device substrate 11 includes a substrate body 31 made of, for example, a light-transmissive material such as glass, quartz or plastic, and a device forming layer 32, an interlayer insulating film 33, an electrode insulating film 34 and an alignment film 35, all of which are sequentially formed on the inner surface (the liquid crystal layer 13 side) of the substrate body 31. The device substrate 11 includes the common electrode 36 placed on the inner surface of the interlayer insulating film 33 and the pixel electrodes 21 placed on the inner surface of the electrode insulating film 34.

The device forming layer 32 includes a lamination of an insulating film, a semiconductor film and a conductive film and configures wires such as the data lines 23 or the scan lines 24 and the TFTs 22 shown in FIG. 2.

The interlayer insulating film 33 is, for example, made of a light-transmissive material such as acrylic and is formed so as to cover the device forming layer 32.

The electrode insulating film 34 is, for example, made of a light-transmissive material such as SiN and is formed so as to cover the common electrode 36 formed on the interlayer insulating film 33.

The alignment film 35 is, for example, made of a resin material such as polyimide and is formed so as to cover the pixel electrodes 21 formed on the electrode insulating film 34. The surface of the alignment film 35 is subjected to alignment treatment for regulating an initial alignment state of liquid crystal molecules configuring the liquid crystal layer 13.

The common electrode 36 is formed so as to cover the interlayer insulating film 33 and is, for example, made of a light-transmissive conductive material such as indium tin oxide (ITO). Openings (not shown) for connecting the pixel electrodes 21 and the drains of the TFTs 22 formed on the device forming layer 32 are formed in the common electrode 36. A signal of which a predetermined voltage used for driving the liquid crystal layer 13, 0 V or another predetermined voltage different from the predetermined voltage is changed periodically (in a frame period or a field period) is applied to the common electrode 36.

Each of the pixel electrodes 21 includes a plurality of band-shaped portions 21a which are formed at an interval in a stripe shape and a frame portion 21b for electrically connecting the band-shaped portions 21a.

In the display device 1, a voltage is applied across the band-shaped portions 21a and the common electrode 36 so as to drive the liquid crystal by an electric field (horizontal electric field) generated in a substrate planar direction. Accordingly, the pixel electrodes 21 and the common electrode 36 configure a fringe-field switching (FFS) type electrode structure.

Meanwhile, the counter substrate 12 includes a substrate body 41 made of a light-transmissive material such as glass, quartz or plastic, and a light-shielding film 42, a color filter layer 43 and an alignment film 44, all of which are sequentially laminated on the inner surface (the liquid crystal layer 13 side) of the substrate body 41. As shown in FIGS. 3 and 4, the counter substrate 12 includes detection electrodes 51 and 52 formed on the outer surface of the substrate body 41, routed wires 53, a terminal portion 54, and a coating film 55 for coating the detection electrodes 51 and 52, the routed wires 53 and the terminal portion 54.

As shown in FIG. 3, the light-shielding film 42 is formed in a lattice shape in a plan, in edge portions of the sub pixel areas in a plan view in the surface of the substrate body 41, that is, in an area in which the TFTs 22 or the data lines 23 and the scan lines 24 overlap each other via the liquid crystal layer 13. The light-shielding film 42 surrounds the sub pixel areas.

The color filter layer 43 is provided in the area partitioned by the light-shielding film 42 in correspondence with the sub pixel areas, is made of acrylic, and contains colored materials corresponding to respective colors displayed in the sub pixel areas.

The alignment film 44 is, for example, made of a light-transmissive resin material such as polyimide and is provided so as to cover the light-shielding film 42 and the color filter layer 43. The inner surface of the alignment film 44 is subjected to alignment treatment.

As shown in FIG. 4, the detection electrodes 51 and 52 are formed in plural numbers (five detection electrodes 51 and 52 in the present embodiment) in a detection area A which overlaps the image display area and is, for example, made of a light-transmissive conductive materials such as ITO. The detection electrodes 51 and 52 are formed in an X-axis direction (first direction) which is one side of the substantially rectangular detection area A in a plan view. The detection electrode 51 and the detection electrode 52 are alternately arranged in a Y-axis direction (second direction) which is another side of the detection area A and is orthogonal to the X-axis direction.

The detection electrodes 51 and 52 have a right-angled triangular shape in a plan view and the shapes of the detection electrodes 51 and 52 are equal to each other.

The detection electrode 5S is formed such that two sides making the right angle are respectively parallel to the X-axis direction and the Y-axis direction and an oblique side is inclined from the X-axis direction and the Y-axis direction and is directed toward one side (+Y side) of the Y-axis direction. The width of the detection electrode 51 gradually narrows from one side (−X side) from the other side (+X side) of the X-axis direction.

The detection electrode 52 is formed such that two sides making the right angle are respectively parallel to the X-axis direction and the Y-axis direction and an oblique side is inclined from the X-axis direction and the Y-axis direction and is directed toward the other side (−Y side) of the Y-axis direction. The width of the detection electrode 52 gradually widens from one side (−X side) from the other side (+X side) of the X-axis direction.

Here, the plurality of detection electrodes 51 are sequentially called detection electrodes 51A to 51E from a detection electrode located at the most −Y side. The plurality of detection electrodes 52 are sequentially called detection electrodes 52A to 52E from a detection electrode located at the most −Y side.

In the substantially right-angled triangular detection electrodes 51 and 52, two adjacent detection electrodes 51 and 52 of which the oblique sides face each other in the Y-axis direction configure each detection electrode pair 56. Accordingly, in each detection electrode pair 56, a ratio of the width of one detection electrode 51 to the width of the other detection electrode 52 is gradually changed from the −X side to the +X side in the X-axis direction. That is, the ratio of the width of the detection electrode 51 is gradually decreased and the ratio of the width of the detection electrode 52 is gradually increased, from the −X side to the +X side in the X-axis direction.

The appearance of the detection electrode pair 56 has a substantially rectangular shape in a plan view since the oblique sides of the detection electrodes 51 and 52 face each other. The number of the detection electrode pair 56 is 5 because the number of each of the detection electrodes 51 and 52 are 5.

Here, the five detection electrode pairs 56 are sequentially called detection electrode pairs 56A to 56E from a detection electrode pair located at the −Y side. That is, the detection electrode pair 56A is formed by the detection electrodes 51A and 52A, the detection electrode pair 56B is formed by the detection electrodes 51B and 52B, the detection electrode pair 56C is formed by the detection electrodes 51C and 52C, the detection electrode pair 56D is formed by the detection electrodes 51D and 52D, and the detection electrode pair 56E is formed by the detection electrodes 51E and 52E.

Figure 5:
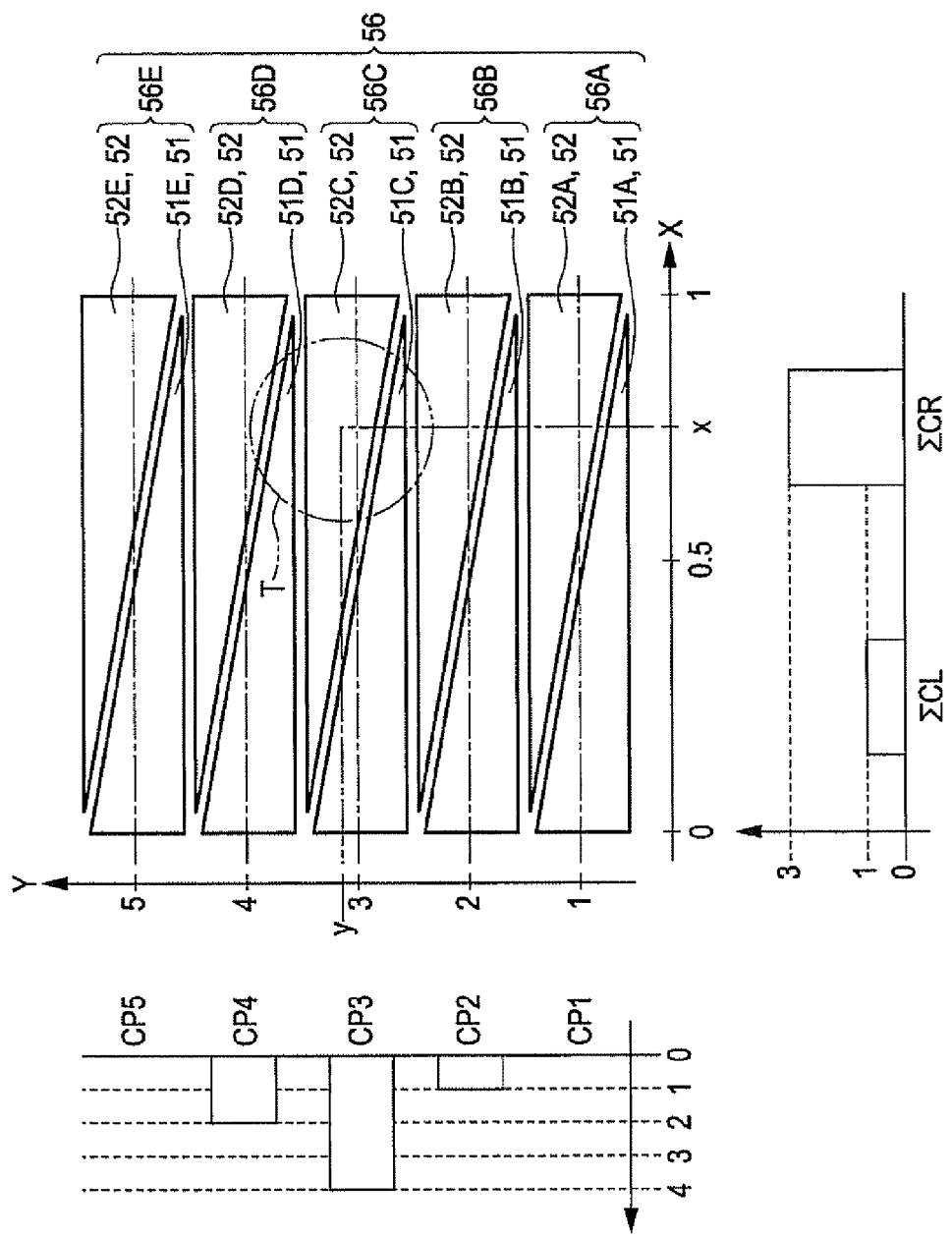
FIG. 5 is a view showing a method of calculating a coordinate.

As shown in FIG. 5, an X coordinate of the X-axis direction and a Y coordinate of the Y-axis direction which can be detected in the substantially rectangular detection area A in a plan view are respectively a range from 0 to 1 and a range from 1 to 5. Here, the value of the X coordinate corresponding to an edge of the −X side of the detection area A is 0 and the value of the X coordinate corresponding to an edge of the +X side of the detection area A is 1. The value of the Y coordinate corresponding to a central line of the detection electrode pair 56A parallel to the X-axis direction is 1, the value of the Y coordinate corresponding to a central line of the detection electrode pair 56B parallel to the X-axis direction is 2, the value of the Y coordinate corresponding to a central line of the detection electrode pair 56C parallel to the X-axis direction is 3, the value of the Y coordinate corresponding to a central line of the detection electrode pair 56D parallel to the X-axis direction is 4, and the value of the Y coordinate corresponding to a central line of the detection electrode pair 56E parallel to the X-axis direction is 5.

As shown in FIG. 4, the routed wires 53 are formed along the outer circumference of the counter substrate 12 on the outer surface of the substrate body 41 together with the detection electrodes 51 and 52 and are connected to the detection electrodes 51 and 52 and the terminal portion 54. The routed wires 53 are made of a conductive material having smaller resistivity than ITO, such as aluminum (Al). The routed wires 53 connected to the detection electrode 51 are connected to the detection electrodes 51 at the edge portion of the −X side of the detection electrodes 51. The routed wires 53 connected to the detection electrodes 52 are connected to the detection electrodes 52 at the edge portion of the +X side of the detection electrodes 52.

The terminal portion 54 is formed outside the −Y side of the detection area A on the outer surface of the substrate body 41 together with the detection electrodes 51 and 52 or the routed wires 53 and is connected to the detection unit 17 provided outside the counter substrate 12. An AC voltage is applied from the detection unit 17 to the detection electrodes 51 and 52 via the terminal portion 54.

As shown in FIG. 3, the polarization plate 15 includes a film which is formed of an insulating material such as polyvinyl alcohol (PVA) as a base material.

Similar to the polarization plate 15, the polarization plate 16 includes a film formed of PVA as a base material. In addition, a protective film (not shown) for protecting the polarization plate 16 may be provided on the outer surface of the polarization plate 16. The transmission axis of the polarization plate 16 is substantially orthogonal to that of the polarization plate 15.

Here, a ¼ wavelength plate may be provided inside the polarization plate 16. By providing the ¼ wavelength plate, it is possible to prevent external light received from the outer surface of the polarization plate 16 from being reflected from the device substrate 11 to be emitted again. In addition, the transmission axis of the polarization plate 16 is properly changed in accordance with the ¼ wavelength plate.

In addition, an optical compensation film (not shown) may be provided at one side or both sides of the polarization plates 15 and 16. By providing the optical compensation film, it is possible to compensate for the phase difference of the liquid crystal layer 13 when obliquely viewing the display device 1, reduce light leakage, and increase contrast. As the optical compensation film, a combination of a negative uniaxial medium and a positive uniaxial medium or a biaxial medium of which refractive indexes of respective directions have a relationship of nx>nz>ny may be used.

As shown in FIG. 1, the detection unit 17 applies an AC voltage to the detection electrodes 51 and 52 via the terminal portion 54, detects capacitance between the detection electrodes 51 and 52 via the polarization plate 16 and the coating film 55, and detects a difference between a voltage detected in a reference state in which a finger does not touch and a voltage detected in a state in which the finger touches, as a capacitance variation.

A calculation unit 18 includes an X coordinate calculation unit (first coordinate calculation unit) 18A for calculating a coordinate of the X-axis direction and a Y coordinate calculation unit (second coordinate calculation unit) 18B for calculating a coordinate of the Y-axis direction, from the capacitance variation of the detection electrodes 51 and 52 detected by the detection unit 17. In addition, the method of calculating the coordinate by the calculation unit will be described later.

A coordinate input device 57 is configured by the counter substrate 12, the polarization plate 16, the detection unit 17 and the calculation unit 18.

Operation of Display Device

Next, the operation of the display device 1 having the above-described configuration will be described. Light received from the outer surface of the device substrate 11 is converted into straight polarized light by the polarization plate 15 and is made incident to the liquid crystal layer 13.

In an off state in which a voltage is not applied across the pixel electrodes 21 and the common electrode 36, the straight polarized light incident to the liquid crystal layer 13 is emitted from the liquid crystal layer 13 in the same polarized state as when it is made incident by the liquid crystal layer 13. Since the polarization direction of the straight polarized light is orthogonal to the transmission axis of the polarization plate 16, the straight polarized light is blocked by the polarization plate 16 such that the sub pixel areas perform dark display.

In contrast, an on state in which the voltage is applied across the pixel electrodes 21 and the common electrode 36, the straight polarized light incident to the liquid crystal layer 13 is converted into straight polarized light orthogonal to the polarization direction when it is made incident by applying a predetermined phase difference (½ wavelength) by the liquid crystal layer 13 and is emitted from the liquid crystal layer 13. Since the polarization direction of the straight polarized light is parallel to the transmission axis of the polarization plate 16, the straight polarized light transmits through the polarization plate 16 such that display light can be viewed. Thus, the sub pixel areas perform bright display.

When a finger of a person touches the polarization plate 16 in a state in which the AC voltage is applied to the detection electrodes 51 and 52, capacitance is formed between the detection electrodes 51 and 52 and the finger via the polarization plate 16 and the coating film 55. Accordingly, current flows from the detection electrodes 51 and 52 via the capacitance. The detection unit 17 detects a variation in current, which flows by forming the capacitance, as the capacitance variation. The calculation unit 18 calculates a touch position of the finger in the detection area A from the capacitance variation detected by the detection unit 17.

Thereafter, on the basis of information on the calculated touch position, an image displayed in the image display area is changed or the locus of the finger moving on the surface of the polarization plate 16 is displayed in the image display area as an image.

Figure 6:
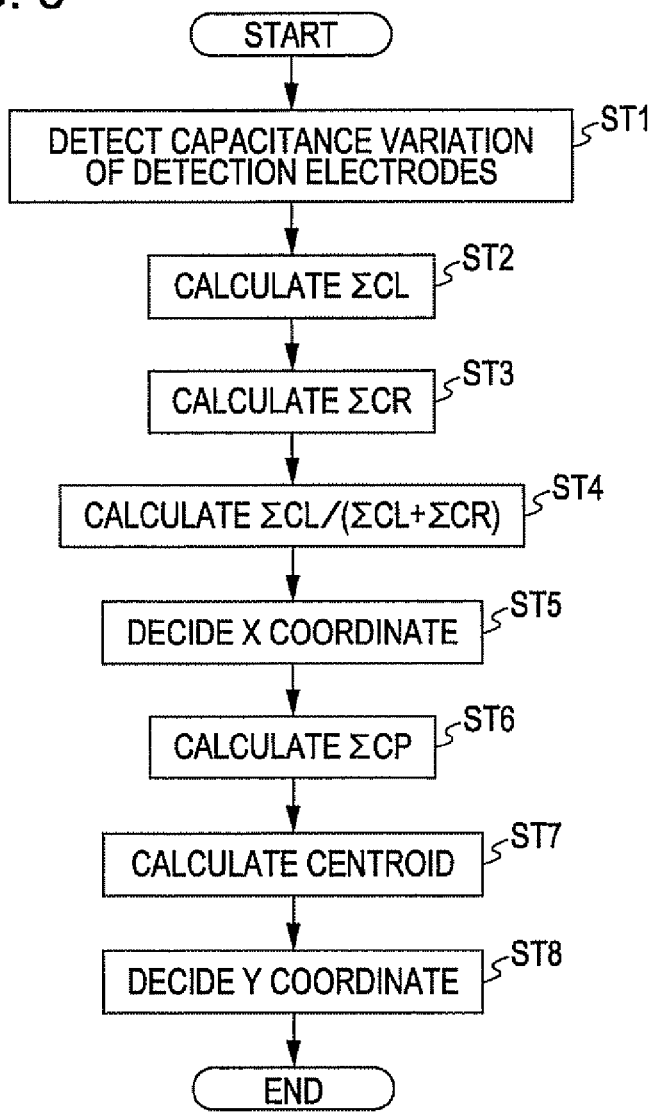
FIG. 6 is a flowchart showing the method of calculating the coordinate.

Now, the method of calculating the touch position will be described in detail. In addition, FIG. 5 is a view explaining the method of calculating the touch position and FIG. 6 is a flowchart showing the method of calculating the touch position. In FIG. 5, a reference numeral T denotes a finger touch area in the polarization plate 16.

First, the detection unit 17 detects capacitance variations CL and CR of the detection electrodes 51 and 52 (step ST1 shown in FIG. 6). The detection unit 17 detects a difference between the capacitance detected by the detection electrodes 51 and 52 in the reference state in which the finger does not touch and the capacitance detected by the detection electrodes 51 and 52 in the state in which the finger touches.

The X coordinate calculation unit 18A calculates ΣCL which is the sum of the capacitance variations CL detected by the detection electrodes 51 (step ST2 shown in FIG. 6) and calculates ΣCR which is the sum of the capacitance variations detected by the detection electrodes 52 (step ST3 shown in FIG. 6). The X coordinate calculation unit 18A calculates a ratio of ΣCL to ΣCR (step ST4 shown in FIG. 6) and calculates the X coordinate (step ST5 shown in FIG. 6).

Accordingly, as shown in FIG. 5, for example, if the ratio of ΣCL to ΣCR is 1:3, a ratio of ΣCL to (ΣCL+ΣCR) is 1:4 and thus the X coordinate calculation unit 18A calculates 0.75 as the value of the X coordinate.

Meanwhile, the Y coordinate calculation unit 18B calculates capacitance variations CP of the detection electrode pairs 56A to 56E (step ST6 shown in FIG. 6). Then, centroid calculation for calculating the centroids of the capacitance variations of the detection electrode pairs 56A to 56E is performed (step ST7 shown in FIG. 6). The Y coordinate is calculated using Equation 1 (step ST8 shown in FIG. 6).

$$y = \Sigma(n \times CP)/\Sigma CP \qquad \text{Equation 1}$$

where, n×CP denotes a product of the capacitance variation CP of the detection electrode pair 56 and the value of the Y coordinate corresponding to the central line of the width direction of the detection electrode pair 56.

Accordingly, for example, as shown in FIG. 5, it is assumed that the capacitance variation CP1 of the detection electrode pair 56A is 0, the capacitance variation CP2 of the detection electrode pair 56B is 1, the capacitance variation CP3 of the detection electrode pair 56C is 4, the capacitance variation CP4 of the detection electrode pair 56D is 3, and the capacitance variation CP5 of the detection electrode pair 56E is 0. At this time, $(1 \times 0 + 2 \times 1 + 3 \times 4 + 4 \times 2 + 5 \times 0)/(0+1+4+2+0)=3.14$ is obtained. Accordingly, the Y coordinate calculation unit 18B calculates 3.14 as the value of the Y coordinate.

Accordingly, the touch position of the finger is calculated from the values of the X coordinate and the Y coordinate.

Electronic Apparatus

Figure 7:
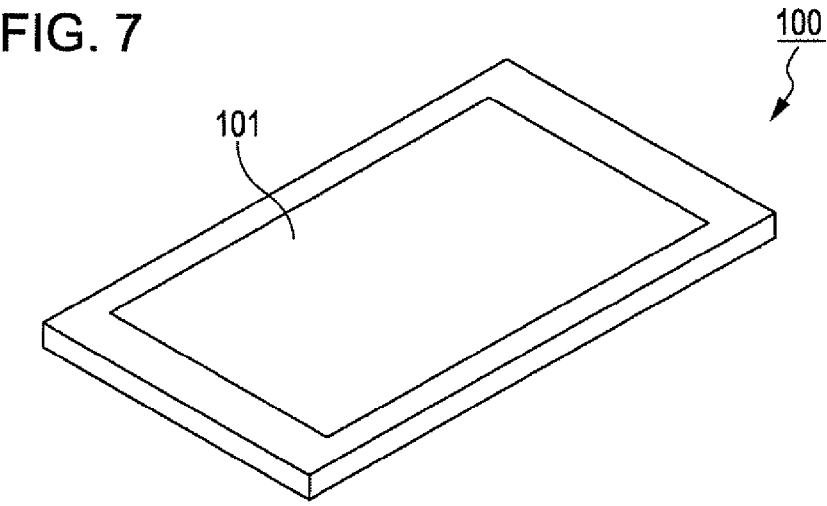
FIG. 7 is a perspective view showing a PDA including the display device.

The display device 1 having the above-described configuration is used as a display unit 101 of a PDA 100 shown in FIG. 7. In the PDA 100, a switch such as a power input switch is properly provided.

As described above, in the coordinate input device 57 and the display device 1 including the same according to the present embodiment, since the detection electrodes 51 and 52, the routed wires 53 and the terminal portion 54 can be formed on the same layer, it is possible to simplify a manufacturing process and reduce manufacturing cost.

Since the detection electrodes 51 and 52 are provided on the outer surface of the counter substrate 12, which is separated from the liquid crystal layer 13, it is possible to obtain high detection precision of the touch position when the finger touches the polarization plate 16.

Second Embodiment

Figure 8:
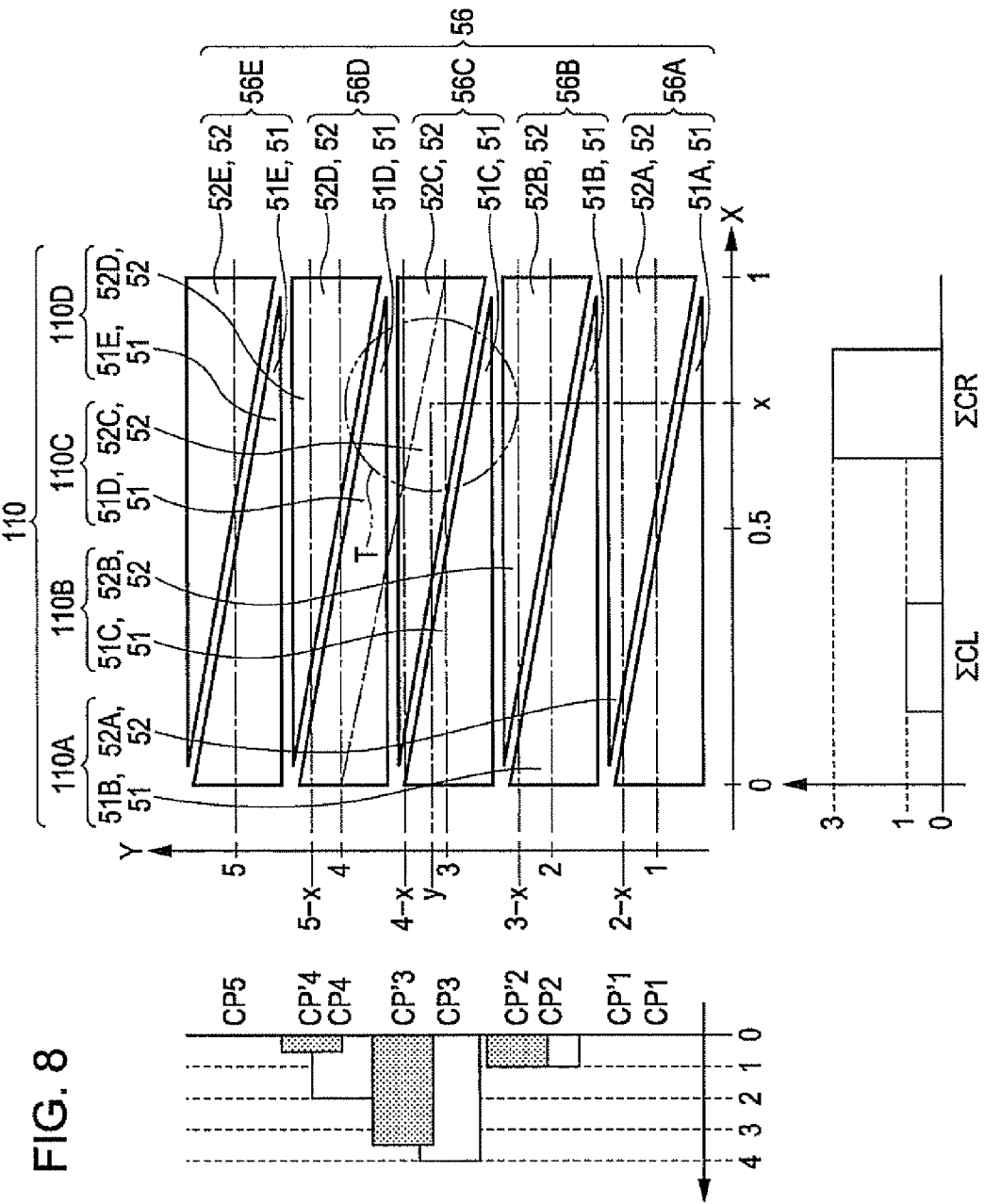
FIG. 8 is a view showing a method of calculating a coordinate according to a second embodiment of the invention.
Figure 9:
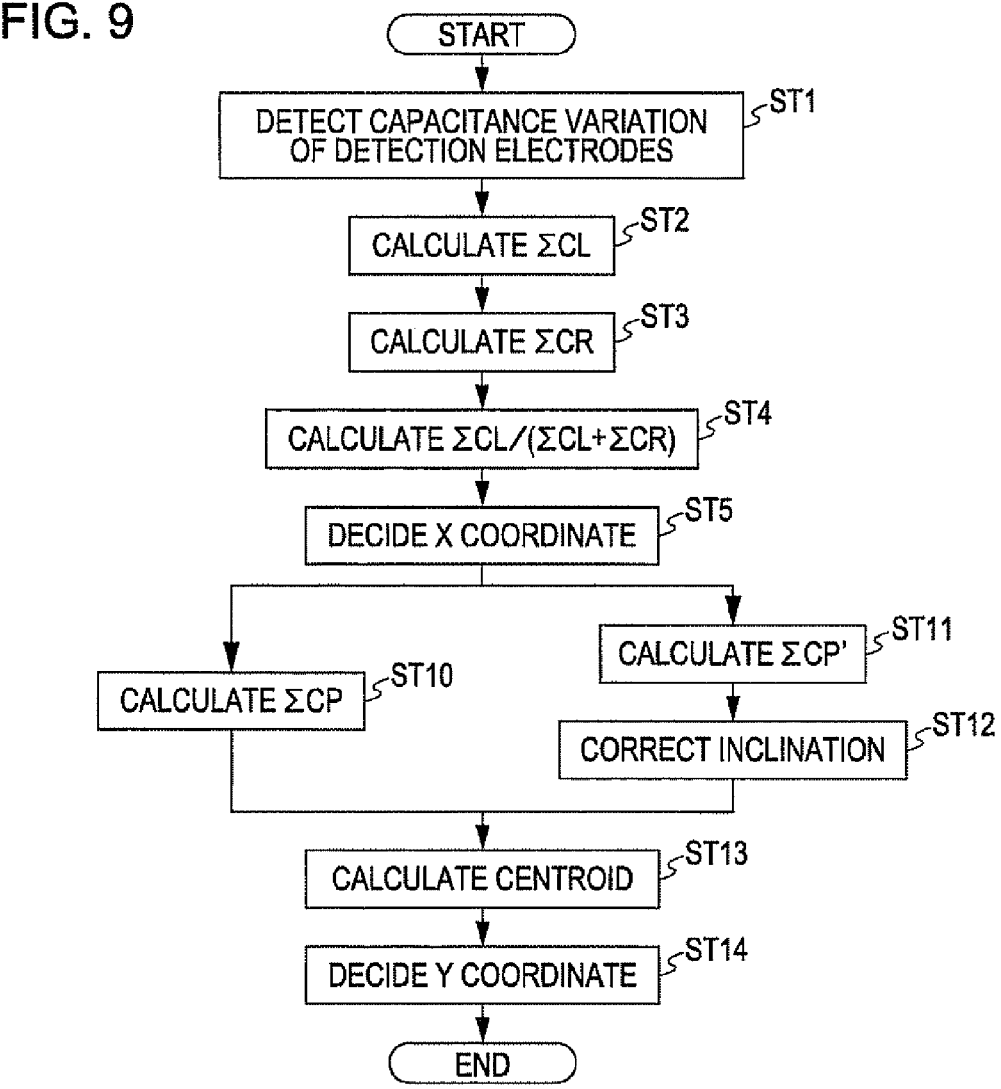
FIG. 9 is a flowchart showing the method of calculating the coordinate.

Next, a coordinate input device and a display device according to a second embodiment of the invention will be described with reference to the accompanying drawings. FIG. 8 is a view explaining the method of calculating the touch position and FIG. 9 is a flowchart showing the method of calculating the touch position. Since the method of calculating the capacitance detection position is different from that of the first embodiment, the present embodiment will be described concentrating on the method. The components described in the above-described embodiment are denoted by the same reference numerals and thus the description thereof will be omitted.

Display Device

In the display device according to the present embodiment, as shown in FIG. 8, each correction detection electrode pair 110 is configured by one detection electrode 51 configuring a detection electrode pair 56 and the other detection electrode 52 configuring another detection electrode pair 56 adjacent to the detection electrode 51. The appearance of each correction detection electrode pair 110 has a substantially parallelogram shape in a plan view, because the sides of the detection electrodes 51 and 52 extending in the X-axis direction face each other. The number of correction detection electrode pairs 110 is 4.

The four correction detection electrode pairs 110 are sequentially called correction detection electrode pairs 110A to 110D from a correction detection electrode pair located at the most −Y side. That is, the correction detection electrode pair 110A is formed by the detection electrodes 51B and 52A, the correction detection electrode pair 110B is formed by the detection electrodes 51C and 52B, the correction detection electrode pair 110C is formed by the detection electrodes 51D and 52C, and the correction detection electrode pair 110D is formed by the detection electrodes 51E and 52D.

Operation of Display Device

First, similar to the first embodiment, the detection unit 17 detects capacitance variations CL and CR of the detection electrodes 51 and 52 (step ST1 shown in FIG. 9).

Similar to the first embodiment, the X coordinate calculation unit 18A calculates the X coordinate (steps ST2 to ST5 shown in FIG. 9).

Accordingly, for example, as shown in FIG. 8, if the ratio of ΣCL to ΣCR is 1:3, the X coordinate calculation unit 18A calculates 0.75 as the X coordinate.

Similar to the first embodiment, the Y coordinate calculation unit 18B calculates capacitance variations CP of the detection electrode pairs 56A to 56E (step ST10 shown in FIG. 9).

The Y coordinate calculation unit 18B calculates capacitance variations CP' of the correction detection electrode pairs 110A to 110D (step ST11 shown in FIG. 9). Here, each of the correction detection electrode pairs 110 has the parallelogram shape in a plan view and the central axis thereof is inclined with respect to the X-axis direction. Accordingly, when the centroids are calculated using CP', the equation needs to be properly changed according to the value of the X coordinate. Accordingly, the Y coordinate calculation unit 18B corrects the equation used for calculating the centroids according to the value of the X coordinate (step ST12 shown in FIG. 9).

Figure 10:
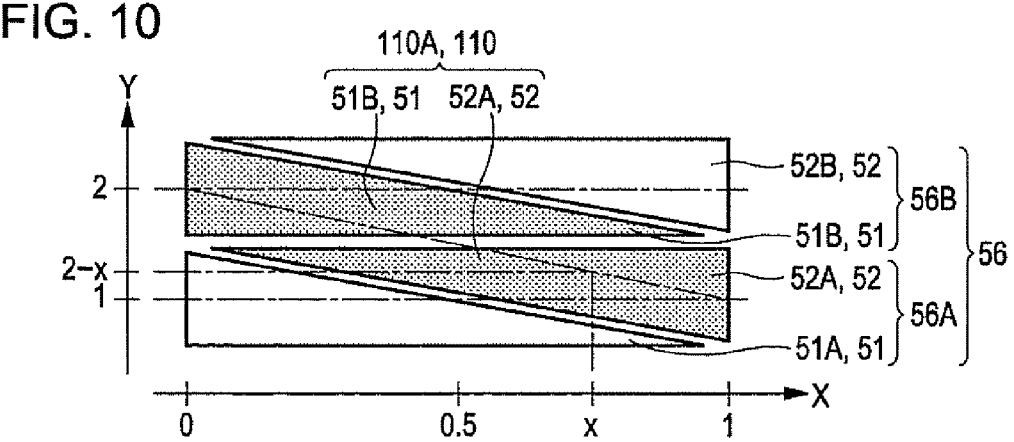
FIG. 10 is a view showing a method of correcting a coordinate.

For example, in the correction detection electrode pair 110A, as shown in FIG. 10, the value of the Y coordinate corresponding to the central line of the width direction when the value of the X coordinate is 0 is 2 and the value of the Y coordinate corresponding to the central line of the width direction when the value of the X coordinate is 1 is 1. Accordingly, the value of the Y coordinate corresponding to the central line of the width direction when the value of the X coordinate is x becomes (2−x). Similarly, the value of the Y coordinate corresponding to the central line of the width direction when the value of the X coordinate is x becomes (3−x) in the correction detection electrode pair 110B, becomes (4−x) in the correction detection electrode pair 110C, and becomes (5−x) in the correction detection electrode pair 110D.

Accordingly, if the value of the X coordinate is 0.75, the values of the Y coordinate become 1.25, 2.25, 3.25 and 4.25.

The Y coordinate calculation unit 18B performs the centroid calculation for calculating the centroids of the capacitance variations using CP and CP' (step ST13 shown in FIG. 9). The Y coordinate of the Y-axis direction is calculated using Equation 2 (step ST14 shown in FIG. 9).

$$y = (\Sigma(n \times CP) + \Sigma(n' \times CP'))/(\Sigma CP + \Sigma CP') \quad \text{Equation 2}$$

where, n×CP denotes a product of the capacitance variation CP of the detection electrode pair 56 and the value of the Y coordinate corresponding to the central line of the width direction of the detection electrode pair 56. In addition, n'×CP' denotes a product of the capacitance variation CP' of the correction detection electrode pair 110 and the value of the Y coordinate corresponding to the central line of the width direction when the value of the X coordinate of the correction detection electrode pair 110 is X.

Accordingly, for example, as shown in FIG. 8, the variation CP1 is 0, the variation CP2 is 1, the variation CP3 is 4, the variation CP4 is 3, and the variation CP5 is 0. In addition, the capacitance variation CP'1 of the correction detection electrode pair 110A is 0, the capacitance variation CP'2 of the correction detection electrode pair 110B is 1, the capacitance variation CP'3 of the correction detection electrode pair 110C is 3.5, and the capacitance variation CP'4 of the correction detection electrode pair 110D is 0.5. At this time, $((1 \times 0 + 2 \times 1 + 3 \times 4 + 4 \times 2 + 5 \times 0) + (1.25 \times 0 + 2.25 \times 1 + 3.25 \times 3.5 + 4.25 \times 1))/$ ((0+1+4+2+0)+(0+1+3.5+0.5))=3.15 is obtained. Accordingly, the Y coordinate calculation unit 18B calculates 3.15 as the value of the Y coordinate.

Accordingly, the touch position of the finger is calculated from the values of the X coordinate and the Y coordinate.

Even in the coordinate input device and the display device including the same, the same operation and effect as the first embodiment are obtained. In addition, since the Y coordinate is calculated using the capacitance variation calculated by the correction detection electrode pair 110, detection precision is improved. Since the correction of the centroid calculation is performed in consideration of the inclination of the central line of the correction detection electrode pair 110 to the X-axis direction, the calculation precision of the Y coordinate is further improved.

Third Embodiment

Figure 11:
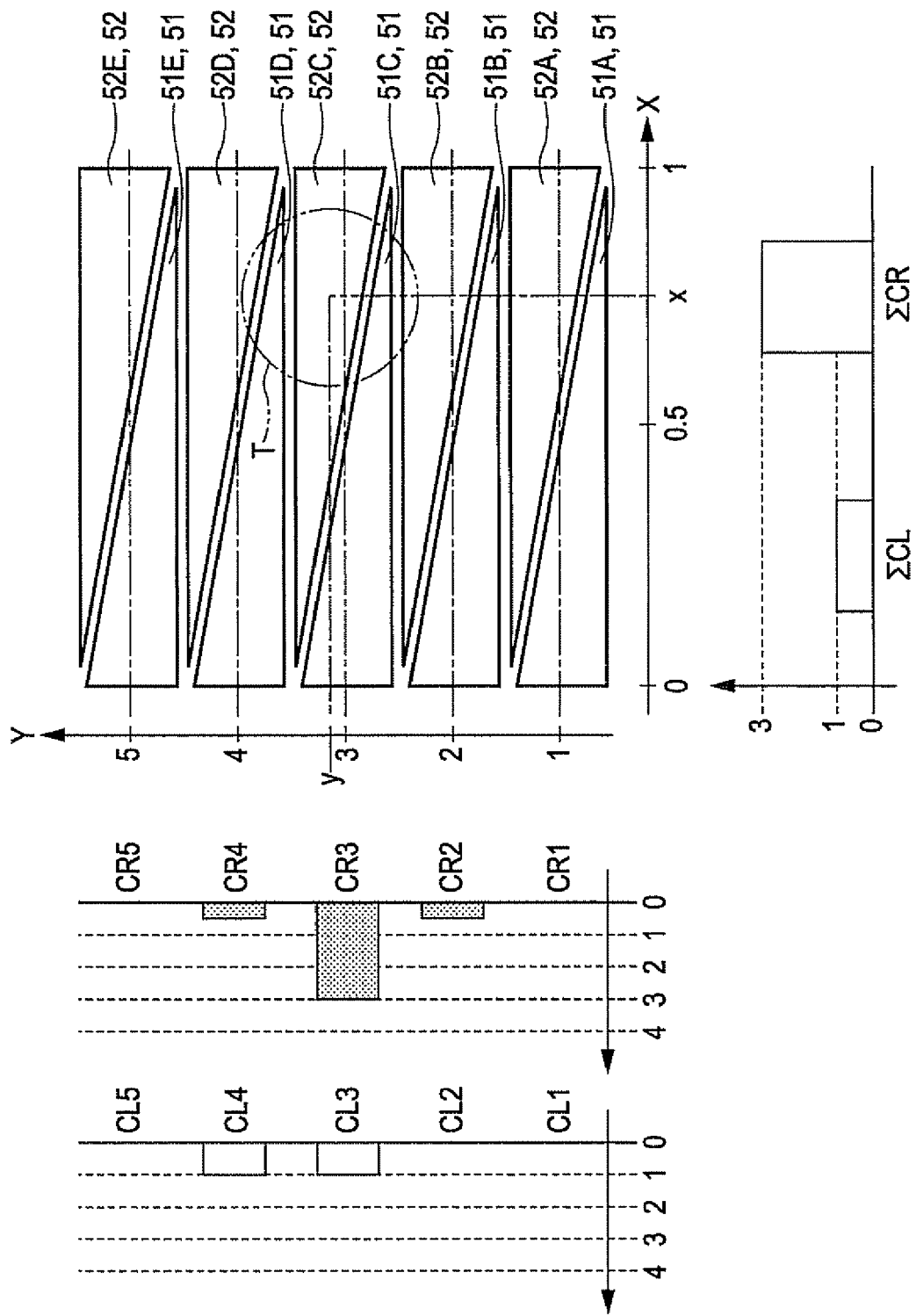
FIG. 11 is a view showing a method of calculating a coordinate according to a third embodiment of the invention.

Next, a coordinate input device and a display device according to a third embodiment of the invention will be described with reference to the accompanying drawings. FIG. 11 is a view explaining the method of calculating the touch position and FIG. 12 is a flowchart showing the method of calculating the touch position.

Next, the method of calculating the touch position using the display device having the above-described configuration will be described.

First, similar to the first embodiment, the detection unit 17 detects capacitance variations CL and CR of the detection electrodes 51 and 52 (step ST1 shown in FIG. 12).

Similar to the first embodiment, the X coordinate calculation unit 18A calculates the X coordinate (steps ST2 to ST5 shown in FIG. 12).

The Y coordinate calculation unit 18B performs the centroid calculation for calculating the centroids of the capacitance variations of the detection electrodes 51A to 51E (step ST20 shown in FIG. 12). A first Y coordinate y1 of the Y-axis direction is calculated using Equation 3.

$$y1 = \Sigma(n \times CL)/\Sigma CL \quad \text{Equation 3}$$

where, n×CL denotes a product of the capacitance variation CL of the detection electrode 51 and the value of the Y coordinate corresponding to the central line of the width direction of the detection electrode pair 56 formed by the detection electrode 51.

Accordingly, for example, as shown in FIG. 11, the capacitance variation CL1 of the detection electrode 51A is 0, the capacitance variation CL2 of the detection electrode 51B is 0, the capacitance variation CL3 of the detection electrode 51C is 1, the capacitance variation CL4 of the detection electrode 51D is 1, and the capacitance variation CL5 of the detection electrode 51E is 0. At this time, (1×0+2×0+3×1+4×1+5×0)/(0+0+1+1+0)=3.5 is obtained. Accordingly, the Y coordinate calculation unit 18B calculates 3.5 as the value of y1.

The Y coordinate calculation unit 18B performs the centroid calculation for calculating the centroids of the capacitance variations of the detection electrodes 52A to 52E (step ST21 shown in FIG. 12). A second Y coordinate y2 of the Y-axis direction is calculated using Equation 4.

$$y2 = \Sigma(n \times CR)/\Sigma CR \quad \text{Equation 4}$$

where, n×CR denotes a product of the capacitance variation CR of the detection electrode 52 and the value of the Y coordinate corresponding to the central line of the width direction of the detection electrode pair 56 formed by the detection electrode 52.

Accordingly, for example, as shown in FIG. 11, the capacitance variation CR1 of the detection electrode 52A is 0, the capacitance variation CR2 of the detection electrode 52B is 0.4, the capacitance variation CR3 of the detection electrode 52C is 3, the capacitance variation CR4 of the detection electrode 52D is 0.5, and the capacitance variation CR5 of the detection electrode 52E is 0. At this time, (1×0+2×0.4+3×3+4×0.5+5×0)/(0+0.4+3+0.5+0)=3.03 is obtained. Accordingly, the Y coordinate calculation unit 18B calculates 3.03 as the value of y2.

Next, the Y coordinate calculation unit 18B calculates an average value of the first and second Y coordinates y1 and y2 (step ST22 shown in FIG. 12). The Y coordinate calculation unit 18B calculates the average value as the Y coordinate (step ST23 shown in FIG. 12).

Accordingly, for example, if y1 is 3.5 and y2 is 3.03, the average value is 3.26. Accordingly, the Y coordinate calculation unit 18B calculates 3.26 as the value of the Y coordinate.

Accordingly, the touch position of the finger is calculated from the values of the X coordinate and the Y coordinate.

Even in the coordinate input device having the above-described configuration and the display device, the same operation and effect as the first embodiment are obtained.

In addition, in the present embodiment, the Y coordinate may be calculated as follows. That is, since the detection electrodes 51 and 52 have the substantially right-angled triangular shape in a plan view, the central axes are inclined with respect to the X-axis direction.

For example, in the detection electrode 51A, as shown in FIG. 13, the value of the Y coordinate corresponding to the central line of the width direction when the value of the X coordinate is 0 is 1 and the value of the Y coordinate corresponding to the central line of the width direction when the value of the X coordinate is 1 is 0.5. Accordingly, the value of the Y coordinate corresponding to the central line of the width direction when the value of the X coordinate is x becomes (1−x/2). Since the value of the Y coordinate corresponding to the central line of the width direction of the detection electrode pair 56A formed by the detection electrode 51A is 1, a difference between the value of the Y coordinate corresponding to the central line of the width direction of the detection electrode pair 56A formed by the detection electrode 51A and the value of the Y coordinate corresponding to the central line of the width direction when the value of the X coordinate is x becomes (−x/2).

For example, in the detection electrode 52A, the value of the Y coordinate corresponding to the central line of the width direction when the value of the X coordinate is 0 is 1.5 and the value of the Y coordinate corresponding to the central line of the width direction when the value of the X coordinate is 1 is 1. Accordingly, the value of the Y coordinate corresponding to the central line of the width direction when the value of the X coordinate is x becomes (1.5−x/2). Since the value of the Y coordinate corresponding to the central line of the width direction of the detection electrode pair 56A formed by the detection electrode 52A is 1, a difference between the value of the Y coordinate corresponding to the central line of the width direction of the detection electrode pair 56A formed by the detection electrode 52A and the value of the Y coordinate corresponding to the central line of the width direction when the value of the X coordinate is x becomes (0.5−x/2).

Figure 14:
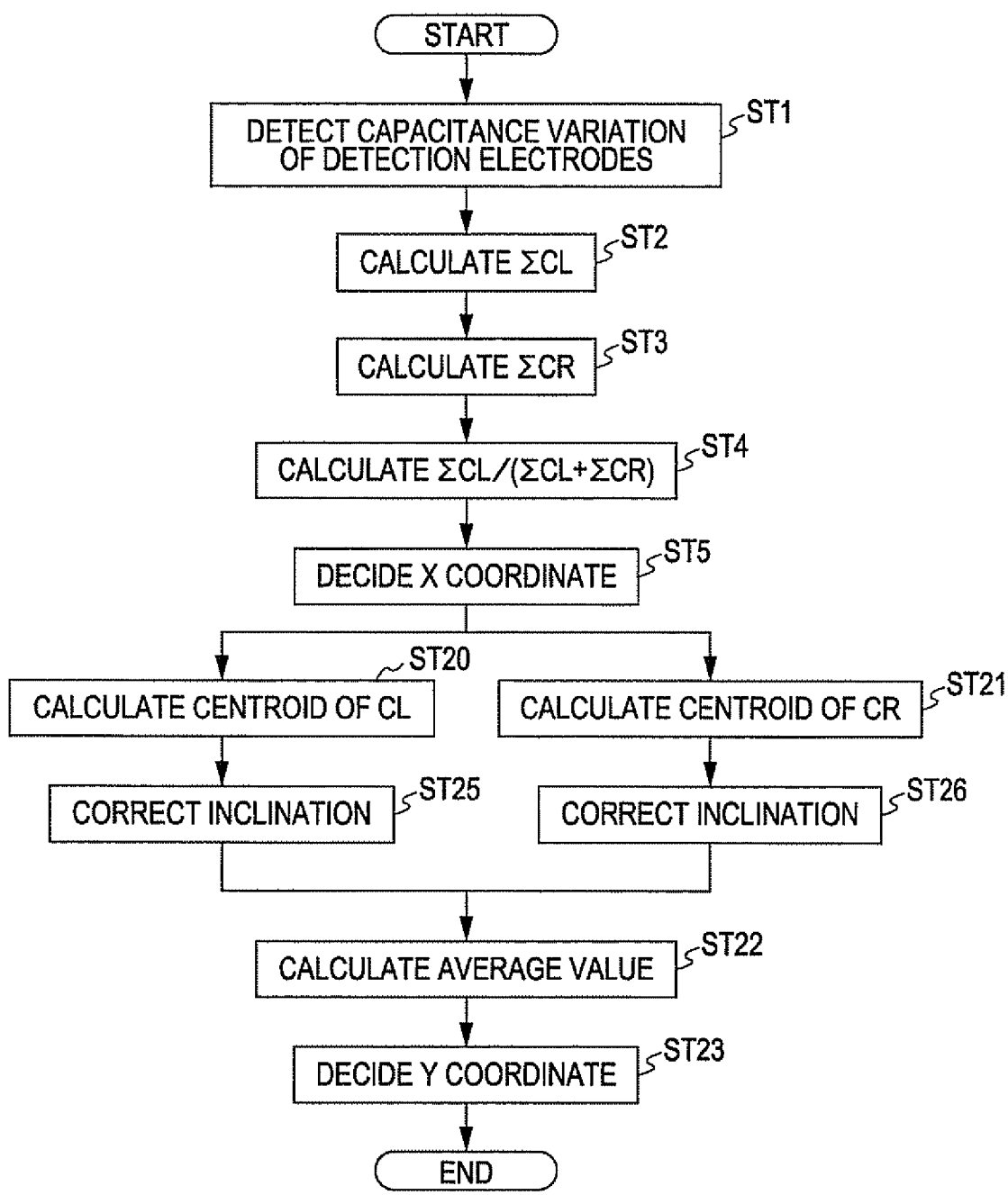
FIG. 14 is a flowchart showing another method of calculating a coordinate according to the present embodiment.

Accordingly, the Y coordinate calculation unit 18B calculates the first Y coordinate y1 by the centroid calculation (step ST20 shown in FIG. 14) and adds (−x/2) to the first Y coordinate y1 (step ST25 shown in FIG. 14). The second Y coordinate y2 is calculated by the centroid calculation (step ST21 shown in FIG. 14) and (0.5−x/2) is added to the second Y coordinate so as to calculate the first and second Y coordinates y1' and y2' after correction (step ST26 shown in FIG. 14).

Accordingly, for example, if y1 is 3.5 and y2 is 3.03, y1' becomes 3.13 and y2' becomes 3.15. Accordingly, the Y coordinate calculation unit 18B calculates 3.14 as the value of the Y coordinate.

Since the calculated value of the Y coordinate is corrected according to the inclinations of the central lines of the detection electrodes 51 and 52 to the X-axis direction, it is possible to suppress influence of an error due to the inclination of the central lines to the X-axis direction.

In the present embodiment, the Y coordinate may be calculated as follows. That is, as described above, the detection electrodes 51 and 52 have the substantially right-angled triangular shape in a plan view. Accordingly, the width of the detection electrode 51 narrows toward the +X side and the width of the detection electrode 52 widens toward the +X side. Here, as the areas of the detection electrodes 51 and 52 located at the capacitance forming position are increased, the detection precision of the capacitance forming position is improved.

Figure 15:
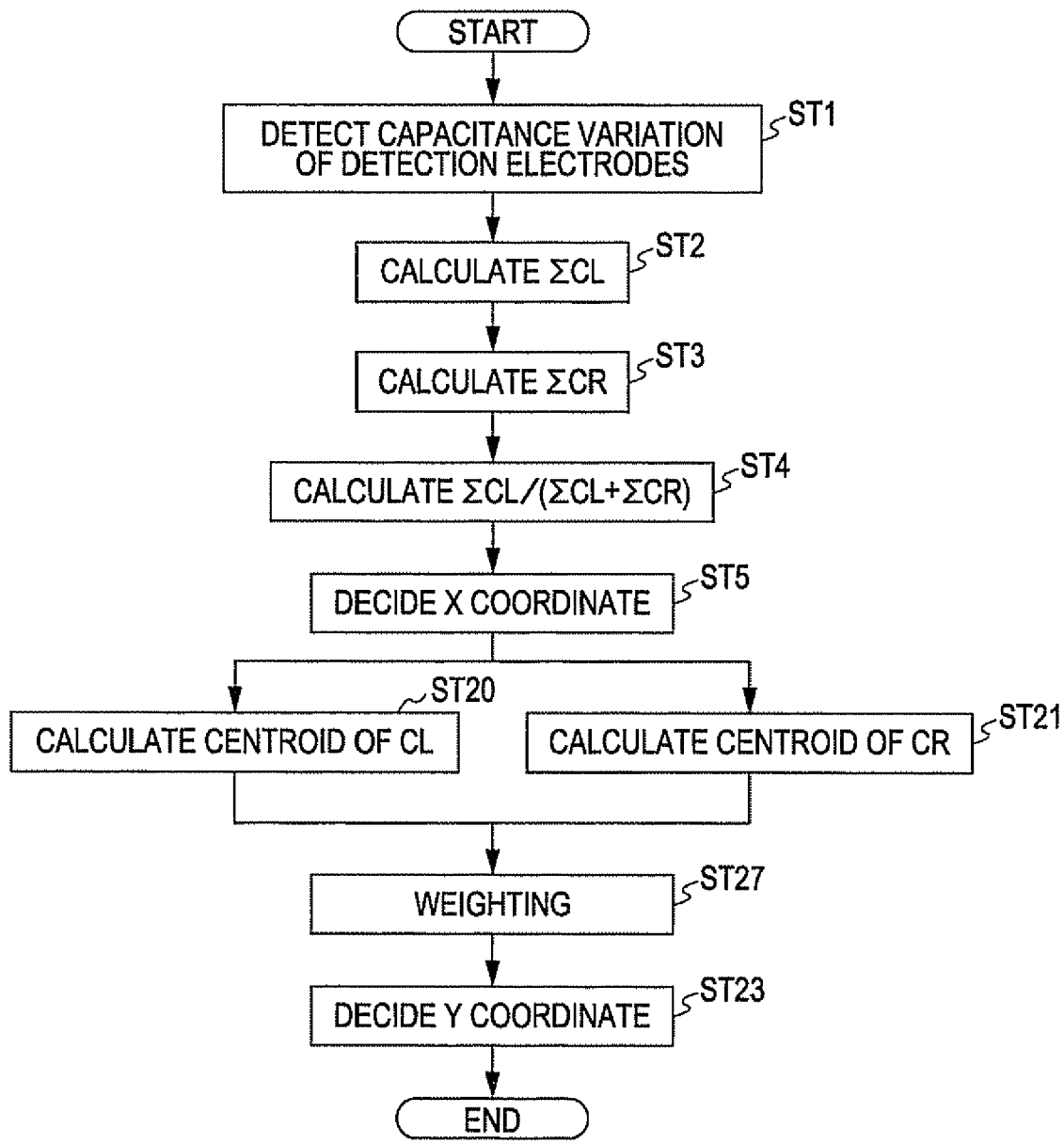
FIG. 15 is a flowchart showing another method of calculating a coordinate according to the present embodiment.

Accordingly, the Y coordinate calculation unit 18B calculates an average value which is obtained by weighting the obtained first and second Y coordinate y1 and y2 according to the value of the X coordinate as the value of the Y coordinate, using Equation 5 (steps ST27 and ST23 shown in FIG. 15).

$$y = (1-x) \times y1 + x \times y2 \qquad \text{Equation 5}$$

Accordingly, for example, if the value of the X coordinate is 0.75, y1 is 3.5 and y2 is 3.03, $(1-0.75) \times 3.5 + 0.75 \times 3.03 = 3.14$ is obtained. Accordingly, the Y coordinate calculation unit 18B calculates 3.14 as the value of the Y coordinate.

By weighting using the value of the X coordinate, it is possible to suppress influence of an error of detection precision according to the areas of the detection electrodes 51 and 52 located at the capacitance forming position.

Fourth Embodiment

Figure 16:
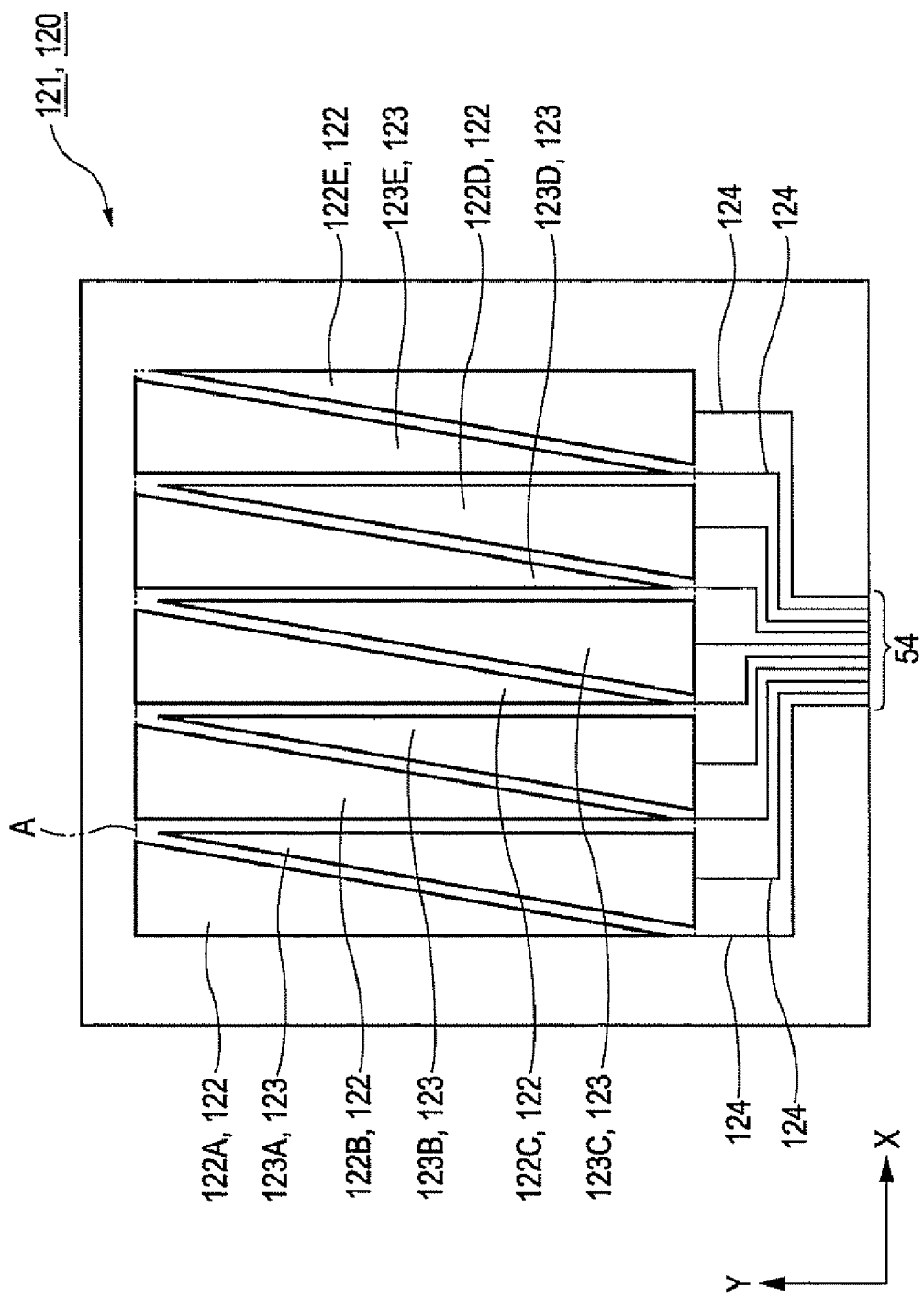
FIG. 16 is a plan view showing an outer surface side of a counter substrate according to a fourth embodiment of the invention.

Next, a coordinate input device and a display device according to a fourth embodiment of the invention will be described with reference to the accompanying drawings. FIG. 16 is a schematic view showing the display device. Since the arrangement of the detection electrodes is different, the present embodiment will be described concentrating on the arrangement of the detection electrodes. The components described in the above-described embodiment are denoted by the same reference numerals and thus the description thereof will be omitted.

In the display device 120 according to the present embodiment, as shown in FIG. 16, detection electrodes 122 and 123 provided on a counter substrate 121 are formed in the Y-axis direction (first direction) which is one side of the detection area A. The detection electrodes 122 and 123 are alternately provided in the X-axis direction (second direction).

Routed wires 124 are connected to ends of the −Y side of the detection electrodes 122 and 123 and are made of a light-transmissive conductive material such as ITO configuring the detection electrodes 122 and 123. By connecting the routed wires 124 to the ends of the −Y side of the detection electrodes 122 and 123 close to the terminal portion 54, the lengths of the routed wires 124 shorten.

Similar to the routed wires 124, the terminal portion 54 is made of a light-transmissive conductive material such as ITO configuring the detection electrodes 122 and 123.

According to the coordinate input device and the display device 120 having the above-described configuration, since the lengths of the routed wires 124 are short, it is possible to suppress resistance values of the routed wires 124 even when the routed wires 124 and the terminal portion 54 are made of the light-transmissive conductive material such as ITO. Since the route wire 124, the terminal portion 54 and the detection electrodes 122 and 123 are made of the same material, it is possible to form the routed wires 124 and the detection electrodes 122 and 123 by the same process, simplify a manufacturing process and reduce manufacturing cost.

The configuration of the detection electrodes 122 and 123 and the routed wires 124 according to the present embodiment is applicable to the second or third embodiment.

Fifth Embodiment

Figure 17:
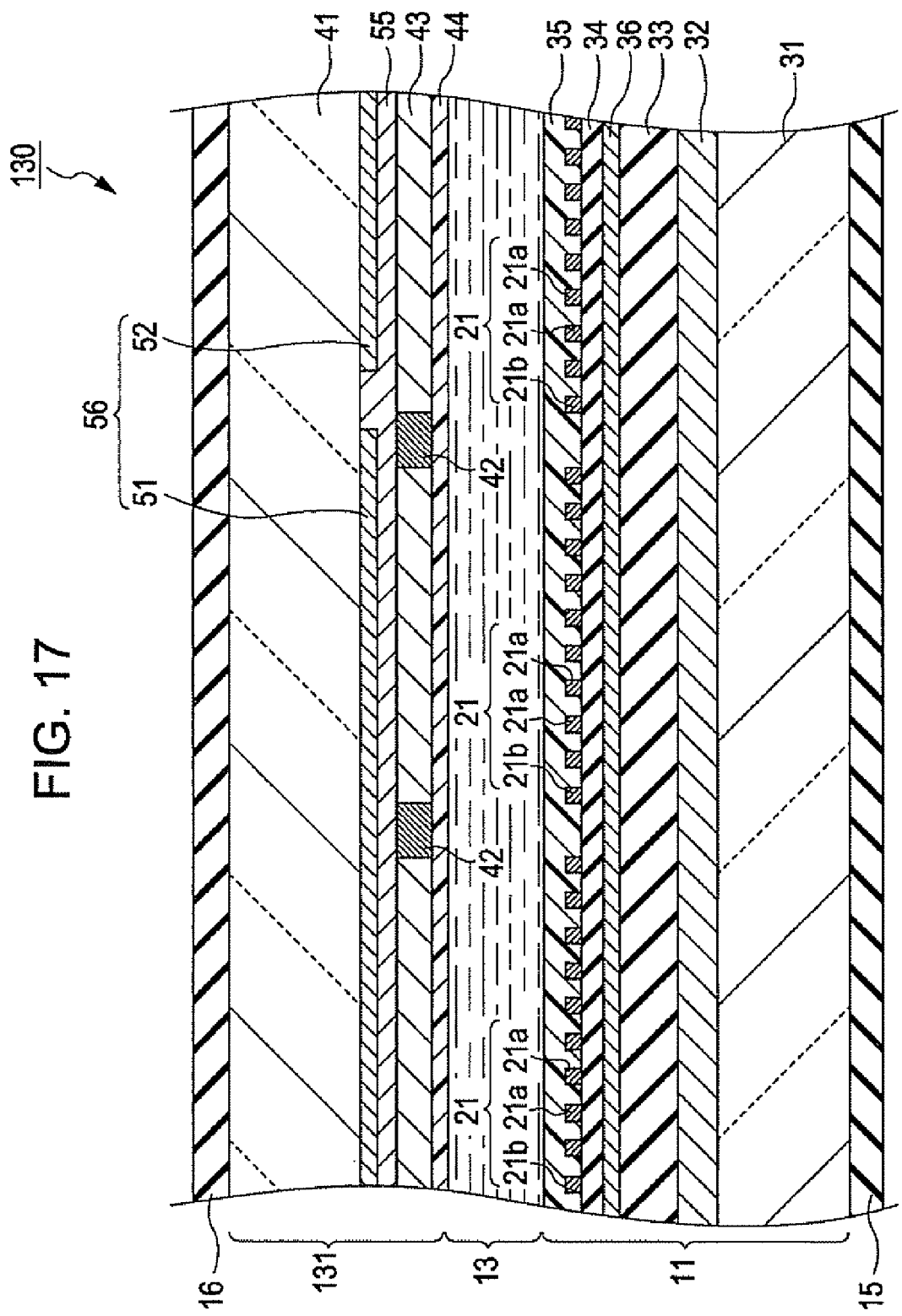
FIG. 17 is a cross-sectional view showing a display device according to a fifth embodiment of the invention.

Next, a coordinate input device and a display device according to a fifth embodiment of the invention will be described with reference to the accompanying drawings. FIG. 17 is a schematic view showing the display device. Since the arrangement of the detection electrodes is different, the present embodiment will be described concentrating on the arrangement of the detection electrodes. The components described in the above-described embodiment are denoted by the same reference numerals and thus the description thereof will be omitted.

In the display device 130 according to the present embodiment, as shown in FIG. 17, the detection electrodes 51 and 52 are formed on the inner surface of the substrate body 41 configuring a counter substrate 131.

That is, the detection electrodes 51 and 52, the routed wires 53 (not shown in FIG. 17) and the terminal portion 54 (not shown in FIG. 17) are formed on the inner surface of the substrate body 41. The detection electrodes 51 and 52, the routed wires 53 and the terminal portion 54 are coated with the coating film 55.

The light-shielding film 42 and the color filter layer 43 are formed on the inner surface of the coating film 55.

According to the coordinate input device and the display device 130 having the above-described configuration, since members such as the detection electrodes 51 and 52, the light-shielding film 42 and the color filter layer 43 are formed on the inner surface of the counter substrate 131, it is possible to simplify a manufacturing process.

In addition, the configuration of the counter substrate 131 according to the present embodiment is applicable to the second to fourth embodiments.

The invention is not limited to the above-described embodiments and various modifications can be made without departing from the scope of the invention.

For example, although the appearance of the detection electrode has the substantially right-angled triangular shape, other shapes may be used if a ratio of widths of detection electrodes in the X-axis direction is changed. That is the appearance of the detection electrode may have a trapezoidal shape in which one of a pair of sides is parallel to the X-axis direction and a base is parallel to the Y-axis direction. The appearance of the detection electrode may have a shape in which a pair of sides is inclined from the X axis, such as isosceles triangle. The appearance of the detection electrode may have a pair of sides which does not have a straight line shape.

Although the detection electrodes configuring the detection electrode pair have the same shape, the detection electrodes may not have the same shape.

If the capacitance forming position can be calculated, the coordinate is not limited to an orthogonal XY coordinate system and a coordinate in two directions which are orthogonal to each other in the detection area may be calculated.

The calculation unit is not limited to the calculation method according to the first to third embodiments and the capacitance forming position may be calculated by other methods.

Although the structure of the pixel electrodes and the common electrode of the display device is the FFS structure, other electrode structures such as an IPS structure may be used.

As the electronic apparatus including the display device is not limited to the PDA. That is, there are various electronic apparatuses such as a mobile phone, a handy terminal, an electronic book, a notebook type personal computer, a personal computer, a digital camera, a liquid crystal television set, a viewfinder-type or direct-view monitor type video tape recorder, a car navigation system, a pager, an electronic organizer, an electronic calculator, a word processor, a workstation, a videophone, and a POS terminal.

Although the display device configures a liquid crystal display device, the display device may configure other display devices such as an organic EL display device or an electrophoretic display device.

Although the coordinate input device is assembled into the liquid crystal display device, the coordinate input device may be configured independent of the liquid crystal display device.

What is claimed is:

1. A coordinate input device comprising:
   a plurality of detection electrodes which are arranged in a planar shape in a detection area of a substrate;
   a plurality of routed wires connected to the plurality of detection electrodes;
   a coating film which coats the plurality of detection electrodes;
   a detection unit which detects a capacitance variation between the plurality of detection electrodes via the coating film; and
   a calculation unit which calculates a capacitance forming position from the detected result of the detection unit,
   wherein the plurality of detection electrodes are formed in the detection area in a first direction and are arranged in a second direction orthogonal to the first direction so as to correspond to a plurality of detection electrode pairs, each of which is composed of a pair of adjacent detection electrodes,
   a ratio of the width of one-side detection electrode of the pair of detection electrodes to the width of an other-side detection electrode of the pair of detection electrodes corresponding to each of the detection electrode pairs is changed according to the first direction,
   each of the plurality of routed wires is connected to a respective one of the detection electrodes at an end of the electrode in the first direction and is formed on the same layer as the plurality of detection electrodes,
   the plurality of detection electrodes corresponding to correction detection electrode pairs, each correction detection pair being composed of the one-side detection electrode corresponding to a detection electrode pair and the other-side detection electrode corresponding to another detection electrode pair adjacent to the one-side detection electrode, and
   the calculation unit comprising:
   a first coordinate calculation unit which calculates a first coordinate which is a detection position of the first direction, based on a sum of the capacitance variations of the one-side detection electrodes and a sum of the capacitance variations of the other-side detection electrodes; and
   a second coordinate calculation unit which calculates a second coordinate which is a detection position of the second direction, from the capacitance variations of the detection electrode pairs, the capacitance variations of the correction detection electrode pairs, and the first coordinate.

2. The coordinate input device according to claim 1, wherein:
   the appearances of the plurality of detection electrodes are equal,
   the width of one-side detection electrode corresponding to each of the detection electrode pairs is decreased from one side to the other side of the first direction, and
   the width of the other-side detection electrode is increased from one side to the other side of the first direction.

3. The coordinate input device according to claim 2, wherein a pair of sides of the plurality of detection electrodes in the first direction has a straight line shape.

4. The coordinate input device according to claim 3, wherein:
   one of the pair of sides is parallel to the first direction and the other one thereof is inclined from the first and second directions, and
   the other sides of the pair of detection electrodes corresponding to each of the detection electrode pairs face each other.

5. The coordinate input device according to claim 1, wherein the second coordinate calculation unit calculates the second coordinate which is corrected on the basis of the inclinations of central lines of a width direction of the correction detection electrode pairs to the central lines of a width direction of the detection electrode pairs.

6. A display device comprising:
   the coordinate input device according to claim 1; and
   another substrate which faces the substrate via a photoelectric layer.

7. The display device according to claim 6, wherein the plurality of detection electrodes are formed on a side of the substrate, which is separated from the photoelectric layer.

8. The display device according to claim 6, wherein the plurality of detection electrodes are formed on a side of the substrate, which is located at the side of the photoelectric layer.

* * * * *